May 29, 1934.  C. H. SCHURR  1,960,460
METHOD FOR CUTTING WORMS
Filed May 5, 1930
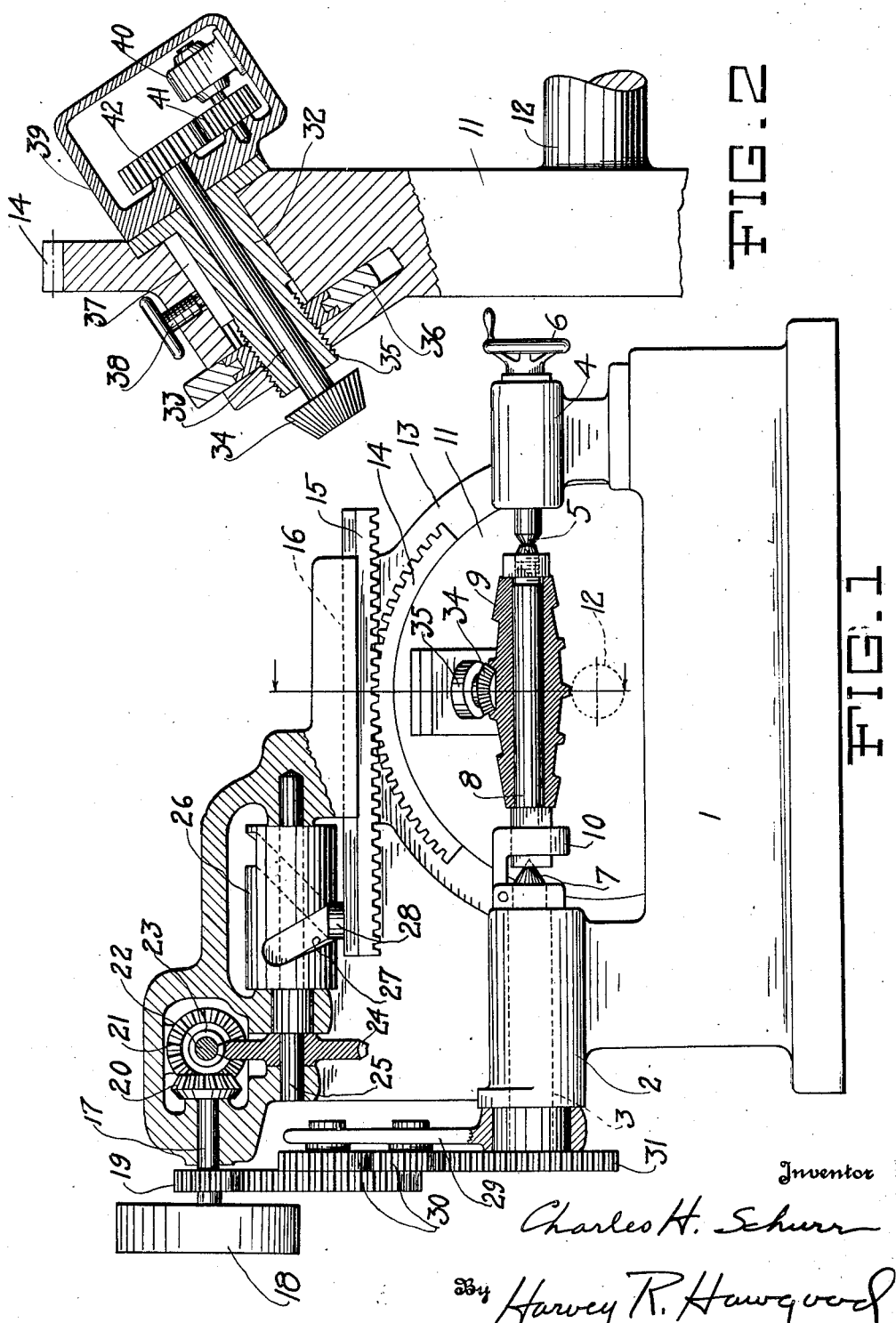
Inventor
Charles H. Schurr
By Harvey R. Hawgood
Attorney Patented May 29, 1934

1,960,460

UNITED STATES PATENT OFFICE 1,960,460

METHOD FOR CUTTING WORMS

Charles H. Schurr, Cleveland, Ohio, assignor to The Lees-Bradner Company, Cleveland, Ohio, a corporation of Ohio Application May 5, 1930, Serial No. 449,701

4 Claims. (Cl. 90—4)

This invention relates to the method and apparatus for cutting worms.

It has heretofore been proposed to cut worms by moving a rotating cutter through an arcuate path while engaging a worm blank, the blank being rotated in a predetermined relation to the travel of the cutter along its path. An apparatus for accomplishing this purpose and a method for operating it is disclosed in the patent to Schurr and Lees, Number 1,243,767.

Worms of the type shown in the above mentioned patent are very useful for transmitting motion from the shaft on which they are mounted through an arm carrying a roller, or the like, engaging the groove in the worm, to a second shaft set at an angle to the first mentioned shaft. However, in producing a groove by moving the cutter at constant speed in relation to the speed of the blank, it is found that the groove formed does not follow a true helix, but that the ridge or land between adjacent convolutions of the groove is much thinner at one end than at the center of the worm, or at the other end. This is apparently due to the fact that at one end of the travel of the cutter, it has a component of motion in the same direction as the part of the blank being worked upon; while at the other end of its travel, the component is in the opposite direction, so that in the former case the cutter travels a greater distance in a direction axially of the blank, while cutting one complete convolution therein, than in the latter. If this land at its thinnest portion possesses the necessary strength, it will be obvious that it becomes unduly wide at other portions, necessitating an undesirably long worm for a given number of convolutions.

It is an object of the present invention to eliminate the disadvantages attendant the cutting of a worm groove by the prior methods, and to produce a worm in which the land will be of substantially uniform width throughout, this width being the minimum compatible with the strength desired.

Another object is to provide an improved apparatus capable of producing a worm possessing the above qualities.

Another object is to provide an improved method for producing a worm possessing these qualities.

Other objects will hereinafter appear.

The invention will be better understood from the description of the apparatus illustrated in the accompanying drawing, which constitutes one embodiment of the invention, and of the method by which it is used, which constitutes another embodiment thereof.

In the drawing, Figure 1 is a side elevation of a machine for producing a worm; and Figure 2 is a fragmentary sectional view taken on the line II—II of Figure 1.

The apparatus consists of a frame or base 1 on which is formed at one end a head stock or spindle support 2 supporting a rotatable spindle 3. At the other end of the bed is an adjustably mounted tail stock 4 carrying a center 5 operated by a hand wheel 6.

The spindle terminates in a center 7 between which and the center 5 an arbor 8, carrying a worm blank 9 the work to be operated upon is supported. A dog 10 is provided by which the arbor is secured to rotate with the spindle.

An arcular or sector-shaped tool support 11 is mounted to oscillate about a horizontal pintle 12, shown as integral therewith, the pintle being journalled in an upwardly extending wall 13 formed on the rear of the base 1.

The upper edge of the support 11 is provided with a toothed sector 14 which meshes with a rack 15 arranged to reciprocate in horizontal guide ways 16 formed in the extension or wall 13. The extension 13 of the frame carries at one upper corner a horizontal shaft 17 which may be rotated by pulley 18 driven by any suitable source of power, not shown. This shaft has keyed to it, on the exterior of the frame, a pinion 19, and within the frame, a bevelled gear 20. The gear 20 meshes with another bevelled gear 21 carried by a horizontal shaft 22, normal to shaft 17, which is provided with a worm 23 meshing with a worm wheel 24. The worm wheel 24 is keyed to a shaft 25 parallel to shaft 17 and journalled in the extension of the frame, and to shaft 25 is also keyed a cylindrical cam 26 having a generally helical groove 27 of varying pitch.

Movable within the groove is a roller 28 attached to one end of the rack 15, so that the rotation of the cam will reciprocate the rack and, through this reciprocation, oscillate the carrier 11, the amount of reciprocation of the rack not being directly proprotional to the rotation of the shaft 25, but being designed to advance the cutting mechanism to produce a land of uniform width.

Upon an arm 29 are mounted change gears 30 forming a train which transmits motion from pinion 19 to a gear 31 keyed to the end of spindle 3, so that the rotation of the spindle and of the cam may be controlled in any desired definite relation.

Carried by the support 11 is a flanged bearing sleeve 32 extending through an angularly disposed bore and journalled in this sleeve is a shaft 33 carrying at one end a frustro-conical milling cutter 34. Obviously, a grinding wheel or any other desired type of cutter might, however, be used. The end of the sleeve adjacent the cutter is threaded at 35, and provided with a nut 36 by which the sleeve may be tightly clamped in the support 11. A key 37 prevents the sleeve from rotating in the carrier and may be pressed against the sleeve by a screw 38 to assist in holding the sleeve rigidly in position. On the outer side, or that remote from the cutter, of the support 11 is a housing 39 in which is positioned a motor 40 which drives the cutter through a pinion 41 secured to the motor shaft, and a gear 42 carried by the shaft 33.

The operation of the device is as follows:—

Power is applied to the pulley 18 and transmitted through the two trains of gearing, (19, 30, 31 and 20, 21, 23, 24) to the spindle 3 and cam 26, respectively, so that the spindle makes a plurality of revolutions while the cam reciprocates the rack from one extreme position to the other, thus rocking the cutter across the face of the blank 9 to cut the curve in the blank. Of course, during this operation, the motor 40 independently drives the cutter. The support 11 may be moved axially either at the start or during the cutting operation, to cause the cutter to penetrate to the desired depth. Obviously by properly designing the groove of cam 26 and selecting suitable gears, it is possible to make the width of the lands uniform throughout or to vary this width in any desired manner, and to vary the size and pitch of the worm produced.

While I have described the illustrated embodiment of my invention in some particularity, obviously many others will readily occur to those skilled in this art, and I, therefore, do not limit myself to the precise details shown and described herein, but claim as my invention all embodiments, variations and modifications coming within the scope of the subjoined claims.

I claim:—

1. A method of forming a worm which consists of rotating a worm blank, rotating a cutter, oscillating the cutter about an axis external thereto and oblique to its own axis, the oscillation of the cutter and rotation of the blank varying in predetermined relation.

2. The method of forming a worm which consists of rotating a cutter, oscillating the cutter about an axis external thereto and oblique to its axis, rotating a worm blank in contact with said cutter at constant speed, and controlling the oscillation of said cutter so that its velocity is less when the direction of its motion has a component in the opposite direction to that of the part of the blank being operated on, and greater when it has a component in the same direction as that of the part of the blank being operated on.

3. The method of forming a worm which consists of rotating a cutter, oscillating the cutter about an axis external thereto and oblique to its axis rotating a worm blank in contact with said cutter at constant speed, feeding the cutter into the blank, and controlling the oscillation of said cutter so that its velocity is less when the direction of its motion has a component in the opposite direction to that of the part of the blank being operated on, and greater when it has a component in the same direction as that of the part of the blank being operated on.

4. The method of forming a worm which consists in rotating a worm blank about its axis, independently rotating a cutter, oscillating the cutter about an axis external thereto and oblique to its axis, the oscillation of the cutter being at a speed varying in relation to the speed of rotation of the blank.

CHARLES H. SCHURR.